US010263929B2

(12) United States Patent
Dunne et al.

(10) Patent No.: US 10,263,929 B2
(45) Date of Patent: Apr. 16, 2019

(54) CLOUD BASED CHAT GOVERNANCE SYSTEM BASED ON BEHAVIORAL PATTERNS AND SITUATIONAL-AWARENESS

(71) Applicant: International Business Machines Corporation, Armonk, NY (US)

(72) Inventors: Jonathan Dunne, Dungarvan (IE); Ravi K. Muthukrishnan, Bangalore (IN); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 14/707,478

(22) Filed: May 8, 2015

(65) Prior Publication Data

US 2016/0330156 A1    Nov. 10, 2016

(51) Int. Cl.
*G06F 17/27*  (2006.01)
*H04L 12/58*  (2006.01)
*H04L 29/08*  (2006.01)

(52) U.S. Cl.
CPC .......... *H04L 51/12* (2013.01); *G06F 17/2705* (2013.01); *G06F 17/2785* (2013.01);
(Continued)

(58) Field of Classification Search
CPC ......... H04L 51/12; H04L 51/04; H04L 67/02; H04L 67/22; G06F 17/2705; G06F 17/2708
See application file for complete search history.

(56) References Cited

U.S. PATENT DOCUMENTS 7,706,785 B2    4/2010  Lei et al.
8,090,777 B2    1/2012  Daniels-Farrar et al.
(Continued)

FOREIGN PATENT DOCUMENTS

WO    2012116197 A2    8/2012
WO    2013042116 A1    3/2013

OTHER PUBLICATIONS

Disclosed Anonymously, "Realtime prioritization of incoming instant messages", IP.com No. IPCOM000206343D, Publication: Apr. 19, 2011, pp. 1-3.
(Continued)

*Primary Examiner* — Viet D Vu
(74) *Attorney, Agent, or Firm* — Dmitry Paskalov

(57) ABSTRACT

A computer-implemented method for intelligent chat governance, is provided. The computer-implemented method includes analyzing an incoming message based on relationship between a plurality of users, content of the incoming message, and metadata of the incoming message. The computer-implemented method further includes calculating a plurality of prioritization metrics of the incoming message based on a comparison of the analyzed message to a knowledge base, wherein the knowledge base includes behavioral tendencies of users of the incoming message, patterns of interaction of the users, and situational awareness of the users. The computer-implemented method further includes the transmitting the incoming message to a client interface of, in response to a determination that at least one of the plurality of prioritization metrics are greater than a threshold level.

17 Claims, 7 Drawing Sheets

(52) U.S. Cl.
CPC .............. *H04L 51/04* (2013.01); *H04L 67/02* (2013.01); *H04L 67/22* (2013.01)

(56) References Cited

U.S. PATENT DOCUMENTS

| | | | |
|---|---|---|---|
| 9,378,467 B1* | 6/2016 | Chaiyochlarb | G06N 99/005 |
| 2004/0154022 A1 | 8/2004 | Boss et al. | |
| 2005/0132011 A1* | 6/2005 | Muller | G06Q 10/109 |
| | | | 709/206 |
| 2005/0149622 A1 | 7/2005 | Kirkland et al. | |
| 2005/0203881 A1* | 9/2005 | Sakamoto | G06F 21/552 |
| 2008/0028031 A1* | 1/2008 | Bailey | G06Q 10/10 |
| | | | 709/206 |
| 2010/0257028 A1* | 10/2010 | Hillerbrand | G06Q 10/067 |
| | | | 705/319 |
| 2011/0040709 A1* | 2/2011 | Proctor | G06N 5/02 |
| | | | 706/12 |
| 2011/0178962 A1 | 7/2011 | Sood | |
| 2012/0116850 A1* | 5/2012 | Abe | G06Q 10/0639 |
| | | | 705/7.38 |
| 2012/0290662 A1* | 11/2012 | Weber | G06N 99/005 |
| | | | 709/206 |
| 2013/0339983 A1 | 12/2013 | Dai et al. | |
| 2014/0047049 A1 | 2/2014 | Poston et al. | |
| 2014/0359022 A1* | 12/2014 | Buddenbaum | H04L 51/32 |
| | | | 709/206 |
| 2015/0039705 A1 | 2/2015 | Kursun | |

OTHER PUBLICATIONS

Avrahami et al., "Responsiveness in Instant Messaging: Predictive Models Supporting Inter-Personal Communication", CHI 2006 Proceedings—Using Knowledge to Predict & Manage, Apr. 22-27, 2006, pp. 731-740.

Wikipedia, "Data Mining", http://en.wikipedia.org/wiki/Datamining, pp. 1-22.

Ranganathan et al., "ConChat: A Context-Aware Chat Program", PERVASIVEcomputing, Jul.-Sep. 2002 IEEE, pp. 51-57.

Mell et al., "The NIST Definition of Cloud Computing", National Institute of Standards and Technology, Special Publication 800-145, Sep. 2011, pp. 1-3.

* cited by examiner

CLOUD BASED CHAT GOVERNANCE SYSTEM BASED ON BEHAVIORAL PATTERNS AND SITUATIONAL-AWARENESS

BACKGROUND

The present invention relates generally to the field of computing, and more particularly to a cloud based chat governance system, based on behavioral patterns and situational-awareness of a plurality of users, during collaborative chat sessions.

The Internet is a global network of computers and networks joined together by gateways that handle data transfer and conversion of messages from a protocol of a sending network to a protocol of a receiving network. Information transmitted between computers travels over the Internet through a variety of languages also referred to as protocols.

The Internet can also be conducive to conducting electronic commerce and other business, or personal transactions, conducted collaboratively, between one or more users, such as, chat messaging sessions. For instance, chat messaging sessions or online chat sessions, may include communication over the Internet that offers a real-time transmission of text messages, between users, from senders to receivers. Chat messaging sessions are generally short in order to enable other participants to respond quickly. Therefore, a feeling similar to a spoken conversation may be created, which distinguishes chatting from other text-based online communication forms such as Internet forums or emails.

SUMMARY

A computer-implemented method for intelligent chat governance is provided. The computer-implemented method includes analyzing an incoming message based on behavioral patterns of users of a chat session, relationship between a plurality of users, content of the incoming message, and metadata of the incoming message. The computer implemented method further includes calculating a plurality of prioritization metrics of the incoming message based on a comparison of the analyzed message to a knowledge base, wherein the knowledge base includes behavioral tendencies of users of the incoming message, patterns of interaction of the users, and situational awareness of the users. The computer-implemented method further includes transmitting the incoming message to a client interface, in response to a determination that at least one of the plurality of prioritization metrics are greater than a threshold level.

A computer system for intelligent chat governance is provided. The computer system includes one or more processors, one or more computer-readable memories, one or more computer-readable tangible storage devices, and program instructions stored on at least one of the one or more storage devices for execution by at least one of the one or more processors via at least one of the one or more memories. The computer system further includes program instructions to analyze an incoming message based on relationship between a plurality of users, content of the incoming message, and metadata of the incoming message. The computer system further include program instructions to calculate a plurality of prioritization metrics of the incoming message based on a comparison of the analyzed message to a knowledge base, wherein the knowledge base includes behavioral tendencies of users of the incoming message, patterns of interaction of the users, and situational awareness of the users. The computer system further include program instructions to transmit the incoming message to a client interface of a second computing system, in response to a determination that at least one of the plurality of prioritization metrics are greater than a threshold level.

A computer program product for intelligent chat governance is provided. The computer product includes one or more computer-readable tangible storage devices and program instructions stored on at least one of the one or more storage devices. The computer program product further includes program instructions to analyze an incoming message based on relationship between a plurality of users, content of the incoming message, and metadata of the incoming message. The computer system further includes program instructions to calculate a plurality of prioritization metrics of the incoming message based on a comparison of the analyzed message to a knowledge base, wherein the knowledge base includes behavioral tendencies of users of the incoming message, patterns of interaction of the users, and situational awareness of the users. The computer system further includes program instructions to transmit the incoming message to a client interface of a second computing system, in response to a determination that at least one of the plurality of prioritization metrics are greater than a threshold level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
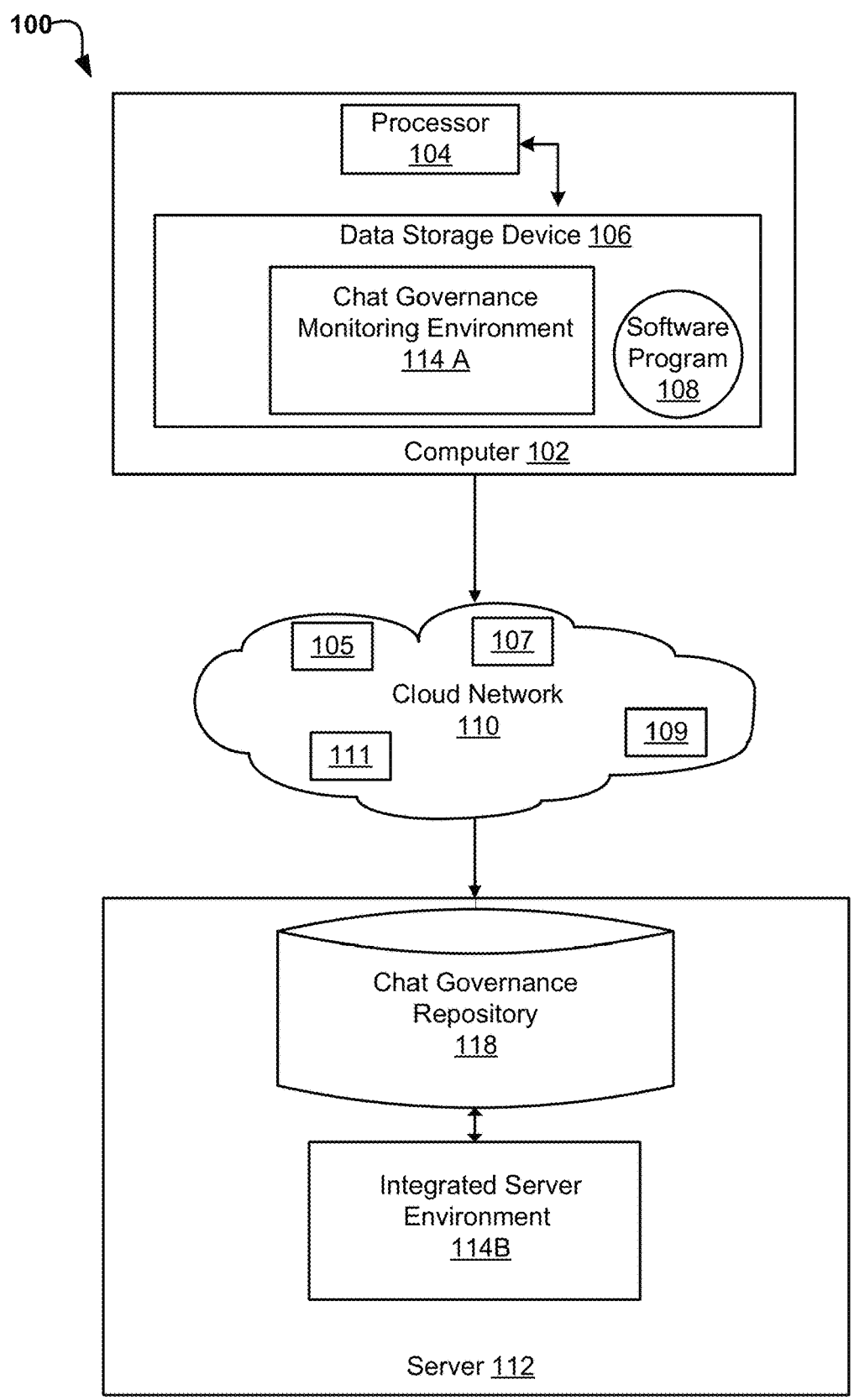
FIG. 1 is a block diagram illustrating a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to cloud based chat governance system based on behavioral patterns and situational-awareness of a plurality of users, during collaborative online chat sessions. The following described exemplary embodiments provide a system, method and program product for chat governance system, based on behavioral patterns and situational-awareness of a plurality of users.

As previously described, with respect to chat messaging sessions, online chat session, or chat messages, may include may include communication over the Internet that offers a real-time transmission of text messages, between users, from sender to receiver. However, there are multiplicities of problems with existing chat systems, such as, for example, requirement of a sender, receiver, or user of the chat system to manually configure incoming messages based on preset flags, such as, Do not Disturb, Available, etc. or blocking names/userIDs, of senders, receivers, or users of the chat system; interruption of chatting session with of either of the sender, the receiver, user, even though the sender, the receiver, or the user may have set the chat system to "In a Meeting" status. Nevertheless, there may be times when other members of the chat session may ping or interrupt the meeting session, regardless of whether or not the sender, the receiver, or the user activated the "In a Meeting" status, e.g. presenting, listening, sharing a screen etc. Also, must users of chat systems change status of chat sessions manually, while, yet frequently the users forget to change their status message indicating their actual status due to multiplicity of reason, or preoccupied tasks.

Another problem with existing chat systems may include ignoring a chat message, by either a chat recipient or chat initiator, such as, for instance, a message is ignored while either the chat recipient or the chat initiator is in a meeting, or conference. There may also be users who have, for example, indicated in a chat message that they are in a meeting. However, unfortunately, the user is not in a meeting, or the user might forget to re-indicate that they are no longer in a meeting. There may also be cases of problems with existing chat systems, based on a user's pattern of past behavior and situational-awareness, of his, or her environment.

For example, in the above example, while one is in a meeting with member of his/her department and presenting she/he may not mind to be interrupted by a high ranking official of a company or an entity, however if the same person is presenting to a client, the person may not want to be interrupted by anyone, including, the high ranking official. However, the person may be fine with getting interruptions from family members, but only if the interruption is a family urgency. As such, it may be advantageous, among other things, to provide a pattern based intelligent chat system, based on a user past behavior and situational-awareness of the users.

According to at least one embodiment, the present invention includes an intelligent chat governance system, based on users' past behavior and situational-awareness. Past behavior is mined, and, as such, it is a relational model which identifies roles or relationship between users of a chat session, or chat system. The patterns may persist in a dynamic knowledge base which learns, monitors, and stores, varies dynamics of the user's behavioral patterns, and updates the behavioral patterns of users during the chat sessions.

Embodiments of the present invention include an intelligent chat system for dynamically building a relational model between a user's past behaviors, patterns of interaction with others and, situational-awareness, of the user, based on the chat sessions, or interactions with other; a self-learning system for continuously monitoring the user's behavior to incorporate the user's past and new patterns of chat interactions, between a plurality of users; an autonomic system for monitoring and governing chat sessions and, leveraging a dynamic knowledgebase with polarity of behavioral patterns and situational metadata, based on the user's behavior; an autonomic system for governing the "status" of user's chart readiness without the user's manual intervention; a situation-aware analytics that establishes the user's roles and relationships with others, via integration with enterprise or social media platforms; prioritization of incoming chats based on the users' behavioral patterns and situational awareness; and building a statistical model to calculate next expected response time.

The present invention may be a system, a method, and/or a computer program product for intelligent chat governance, between users. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for chat governance system based on behavioral patterns and situational-awareness of a plurality of users. According to at least one implementation, chat initiator system, of a user, analyzes an incoming message, based on relationship between a plurality of users, content of the incoming message, and metadata of the incoming message. Also, the chat initiator system further calculates a plurality of prioritization metrics of the incoming message based on a comparison of the analyzed message to a knowledge base, wherein the knowledge base includes behavioral tendencies of users of the incoming message, patterns of interaction of the users, and situational awareness of the users. Additionally, the chat initiator system transmits the incoming message to a client interface of a chat receiving system, if it is determined that at least one of the plurality of prioritization metrics are greater than a threshold level. As such, advantages of the present invention may include, allowing users of chat systems to avoid manual setting/resetting flags or blocking undesired names/id of the chat system. Another advantage may include an automated and dynamic mechanism to govern chat sessions of chat systems between users and, also, a heuristic way to customize chat sessions of the chat systems, based on the context and user feedback/behavior, prevention of undesired interruptions of a user's time.

Referring now to FIG. 1, an integrated systems environment 100, for managing a cloud based chat governance system, based on behavioral patterns of users and, situational awareness of the users, according to embodiments, is depicted.

The integrated systems environment 100 may include a computer 102 with a processor 104 and a data storage device 106 that is enabled to run, or execute program instructions of a software program 108. The computer 102 may also include a chat governance monitoring environment 114A, for monitoring an administrative computing interface, for interactive chat messaging sessions, between at least one user, and administrator of computer 102, whereby the chat messaging session may be a business, or personal messaging session that is performed collaboratively, via an interface of computer 102. The integrated systems environment 100 may also include a server 112, running an integrated server environment 114B and a chat governance repository 114B, interconnected with computer 102, over cloud network 110, for managing the cloud based chat governance system based on behavioral patterns of users and situational awareness of the users and, based on the monitored administrative computing interface of chat governance monitoring environment 114A, according to embodiments.

It should be appreciated that the computing environment 100 of FIG. 1 provides only an illustration of one implementation and, does not imply any limitations with regard to the environments in which different embodiments may be implemented. Many modifications to the depicted environments may be made based on design and implementation requirements. For example, the integrated systems environment 100 may also include a plurality of computers 102 and servers 112, only one of which is shown, at least in FIG. 1.

The cloud network 110 may also include connections, such as wired communication links, wireless communication links, or fiber optic cables. The cloud network 110 may also be implemented as a number of different types of networks, including, for example, a local area network (LAN), wide area network (WAN) or a packet switched telephone network (PSTN), or some other networked system. For example, the integrated systems environment 100 may utilize the Internet with cloud network 110 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

The cloud network 110 may include a public switched network and/or a satellite network, or one or more networks of any kind that can provide communication links between various devices and computers connected together within a multi-service cloud management environment, for managing a cloud based chat governance system. The cloud based chat governance system is based on behavioral patterns of users and, situational awareness of the users of the integrated systems environment 100, such as, host 105, host 107, host 109, or host 111. Each one of the host 105, host 107, host 109, or host 111 may be configured within the cloud management computing network 110 for performing a cloud based, live migration, or re-mapping of virtual machines of computer 102, to at least one of host 105, host 107, host 109, or host 111, during maintenance of at least one host or hypervisor. For example, the host or the hypervisor can be hosted on the cloud, of the cloud network 110, all within the integrated systems environment 100, according to embodiments.

In addition, the chat governance monitoring environment 114A may communicate with integrated server environment 114B, running on server 112, via the communication network 110, for performing management of a cloud based chat governance system, based on behavioral patterns of users and situational awareness of the users, according to embodiments. The cloud network 110 may also include connections, such as wire, wireless communication links, or fiber optic cables. As will be discussed with reference to FIG. 5, server 112 may include internal components 800a and external components 900a, respectively, and computer 102 may include internal components 800b and external components 900b, respectively.

The computer 102 may be, for example, a laptop, tablet, or notebook personal computer (PC), a desktop computer, a mainframe or minicomputer, or a personal digital assistant (PDA). The computer 102 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing an administrative interface of chat governance monitoring environment 114A, via the cloud network 110, for managing a cloud based chat governance system, based on behavioral patterns of users and situational awareness, of the users. In the depicted environment, the database storage device 106 of computer 102 is any type of storage device, storage server, storage area network, redundant array of independent discs (RAID), cloud storage service, or any type of data storage. The database storage device 106 can also be a relational model database server for storing program instructions for displaying information pertaining to behavioral patterns of users and situational awareness of the users, for managing the cloud based chat governance system, according to embodiments.

The server 112 can be, for example, a mainframe server computer system, such as a management server, a web server, or any other electronic device or computing system capable of transmitting data, between server 112 and computer 102, for performing management of a cloud based chat governance system, based on monitored behavioral patterns of users and situational awareness of the users via the chat governance monitoring environment 114A. The server 112 may also represent a "cloud" of computers interconnected by one or more networks, whereby, the server 112 is a primary server of a plurality of server computing systems that utilizes clustered computers, when accessed through the cloud network 110.

For example, a cloud computing system can be an implementation of management of a cloud based chat governance system, based on behavioral patterns of users and situational awareness of the users, between a pluralities of user. The chat governance repository of server 112 is any type of storage device, is any type of storage device, storage server, storage area network, redundant array of independent discs (RAID), cloud storage service, or any type of data storage for storing information relating to management of a cloud based chat governance system, based on behavioral patterns of users and situational awareness of the users. The chat governance repository can also be a relational model database server for storing program instructions for displaying information pertaining to the managed cloud based chat governance system.

Figure 2:
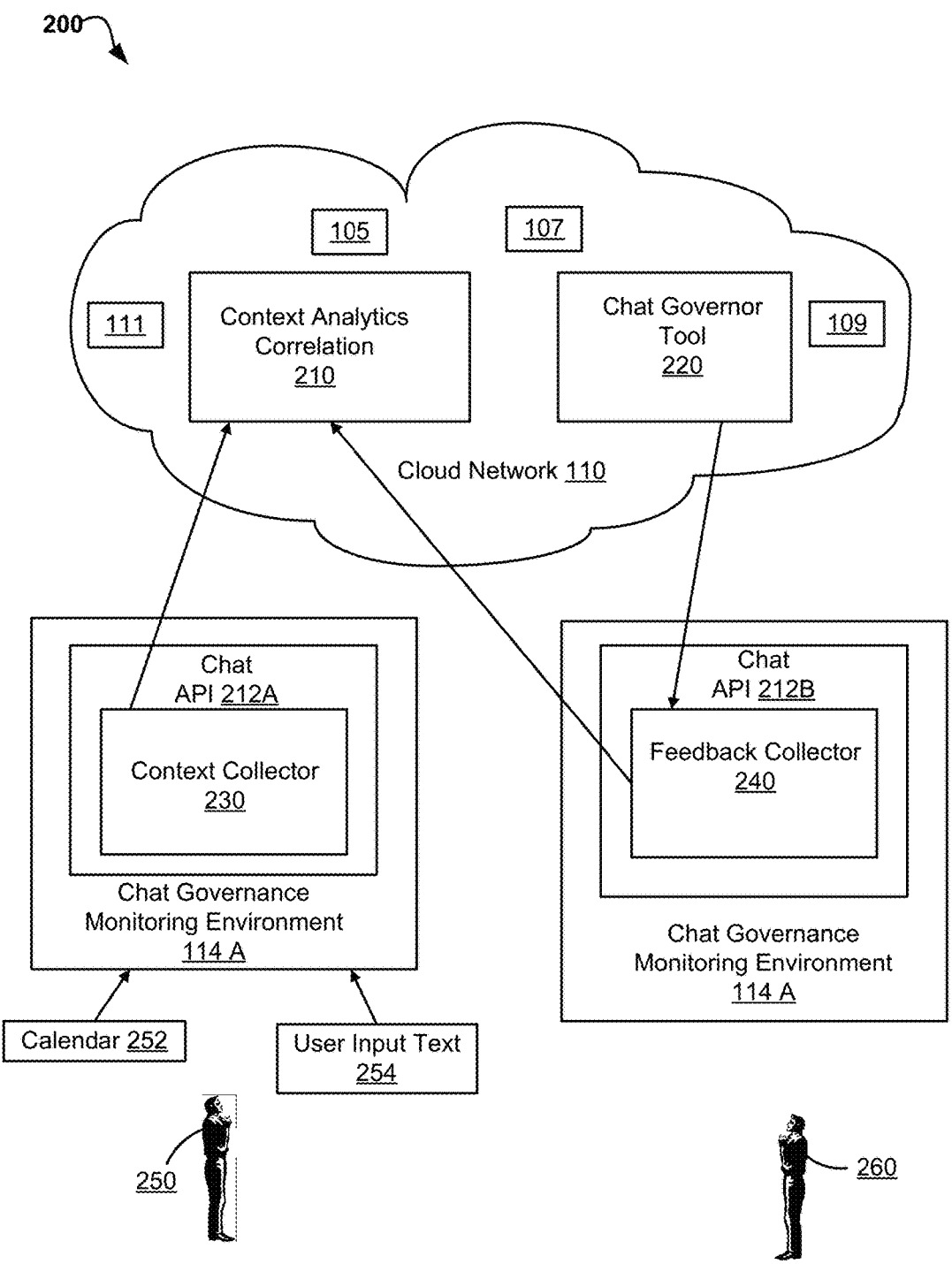
FIG. 2 is a block diagram illustrating a networked computing environment for a cloud based chat governance system based on behavioral patterns and situational-awareness of a plurality of users, during collaborative online chat sessions according to at least one embodiment.

FIG. 2 illustrates a functional block diagram of program components of the integrated systems environment 100 (FIG. 1), for management a cloud based chat governance system, based on behavioral patterns of users and situational awareness of the users, according to embodiments. It should be appreciated that FIG. 2 provides only an illustration of one implementation and does not imply any limitations with regard to the environments in which different embodiments may be implemented. Many modifications to the depicted environment may be made based on design and implementation requirements. FIG. 2 illustrates a cloud based chat messaging session between chat initiator 250 and chat receiver 260, whereby governance of the cloud based messaging session is managed based on behavioral patterns and situational awareness of both chat initiator 250 and chat receiver 260, respectively.

The chat governance monitoring environment 114A (FIG. 1), includes chat application program interface (API) 212A and 212B, respectively. Chat API 212A, Chat API 212B are graphical user interfaces that provide a system platform for monitoring behavioral patterns, of users and situational awareness, of the users, during a chat sessions, between chat initiator 250 and chat receiver 260. Context collector 230 of the chat initiator 250 collects and monitors details of chats or messages, during a chat session, between chat initiator 250 and chat receiver 260, based on criterions for dynamically building relational models of chat messaging behaviors, between chat initiator 250 and chat receiver 260, whereby patterns of chat message interactions between the initiator 250 and the chat receiver 260, are dynamically recorded in chat governance repository (FIG. 1), via cloud network 110 (FIG. 1), according to embodiments.

The context collector 230 transmits the collected details of the behavioral patterns of the chat initiator 250 to context analytics correlation 210. According to embodiments, the context analytics correlation 210 analyzes the transmitted details and, correlates it with previous transmitted details of chat messaging or chat histories between chat initiator 250 and chat receiver 260, respectively, whereby the context analytics correlation 210 utilizes machine learning techniques to analyze the past behavioral patterns, or chat message interactions, of either one of chat initiator 250 and chat receiver 260, respectively.

According to embodiments, based on results of the analyzed behaviors, the chat governor tool 220 determines a prioritization of the messaging session between chat initiator 250 and chat receiver 260 and, determines whether to allow a chat session based on continuously monitored behavior of the chat initiator 250 and chat receiver 260. The integrated server environment 100 could also be extended to inform the chat initiator 250 with useful insights and details about the chat receiver's chat message status, such as, percentage of success at a given time "t" or when the user may be expected to reply next, after 1 hour and so forth. Also, for instance, due to a concern for privacy, either or the chat initiator 250 or the chat receiver 260 may default to normal operating methods of blocking chat with flags or names or any encryption techniques that may be used between the system and the user for dynamically storing the behavioral patterns of the chat initiator 250 or the chat receiver 260.

For example, the context analytics correlation 210 may perform generalized linear modeling analysis on a number of metric, such as: chat partner: Names of chat partner; chat frequency: # of chats sent/received per day; hierarchal relationship: the relationship between chat partners, i.e. are they senior managers, executives, technical peers, or junior staff members; relationship quotient: A score from 0 to 1 on the relationship quotient, how close the relationship is between the two individuals, where 0 being none and 1 being the highest; content heterogeneity quotient, such as, score from 0 to 1 on the content heterogeneity, where 0 being none and 1 being the highest. Such analysis may be leveraged by the context analytics correlation 210 from existing data mining art.

A score from 0 to 1 on the business impact where 0 being none 1 being the highest. Once the context analysis correlation 210 collects and monitors details of chats or messages, during a chat session, between chat initiator 250 and chat receiver 260, based on criterions for dynamically building relational models of chat messaging behaviors, of either chat initiator 250 and chat receiver 260, the chat governor tool 220 determines prioritization of the message/chat session and, determines whether to allow the chat or block the chat based on criterions for dynamically building relational models of chat messaging behaviors, between chat initiator 250 and chat receiver 260, whereby patterns of chat message interactions between the initiator 250 and the chat receiver 260, are dynamically recorded in chat governance repository 118, according to embodiments.

For example, an action taken by the chat governor tool 220 may also include notification of chat destination user alternative communication methodologies, such as, sending the chat message to a mobile number for notifying the chat receiver 260 via alternative communication methodologies, such as, a mobile number for notifying the chat request or calling chat destination user mobile number. The feedback collector 240 of chat governance monitoring environment 112A, notifies the chat receiver 260 whether the message may be available to resume a chat session. Consider an example, chat imitator 250, a software engineer, at an entity, is trying to chat with chat receiver 260, an architect within the same entity, at 4.30 PM EST on Mar. 26, 2014. The chat initiator 250 opens the chat system via the chat API 212 and, types a message for transmission to chat receiver 260, "Are you going to join the call we have right now?" The chat API 212A records the typed input text as natural language processing language, and gathers metadata about both chat initiator and chat receiver 260, and transmit the metadata to integrated server environment, whereby the integrated server environment analyzes the metadata for managing the cloud based chat governance system, based on behavioral patterns of users and situational awareness of the chat initiator and chat receiver.

The integrated chat environment 100 (FIG. 1) determines that the chat initiator and the chat receiver 260 have a meeting setup in their calendar at 4.30 PM EST on Mar. 26, 2014, based on the determination, the integrated server environment 100 analyzes a previous chat blockage history between the chat imitator 250 and the chat receiver 260, including, chat blockage feedback response of the chat initiator 250 to chat with the chat receiver 260 and, based on analyzes of blocked chats between the chat initiator 250 and the chat receiver 260, the integrated chat environment 100 decides whether to allow the chat to be initiated between the chat initiator 250 and the chat receiver 260, since the chat message is of priority in the context.

Figure 3:
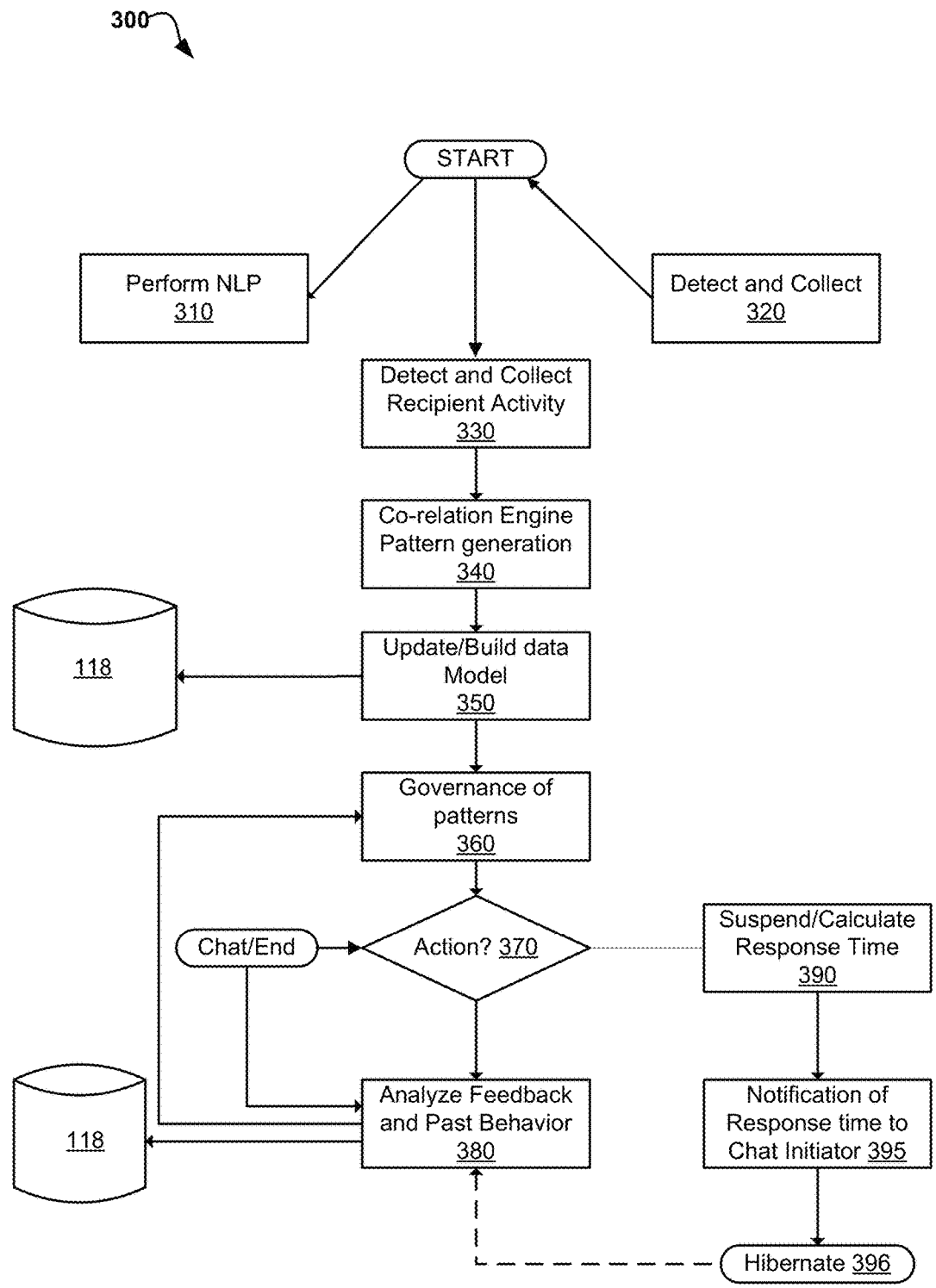
FIG. 3 illustrates an operational flowchart illustrating the steps carried out by a program for cloud based chat governance system based on behavioral patterns and situational-awareness of a plurality of users, during collaborative online chat sessions according to at least one embodiment.

FIG. 3 illustrates a flow diagram 300 for management of a cloud based chat governance system, between the computer 102 (FIG. 1) and the server 112 (FIG. 1) and, also, based on behavioral patterns of users and situational awareness of the users, such as, for instance, chat initiator 250 (FIG. 2) all within integrated systems environment 100 (FIG. 1).

It should be appreciated that FIG. 3 provides only an illustration of one implementation and does not imply any limitations with regard to the environments in which different embodiments may be implemented. The flow diagrams starts in the event that chat initiator 250 (FIG. 2) initiates a chat session with chat receiver 260 (FIG. 2) within integrated systems environment 100 (FIG. 1), whereby, for example, chat initiator 250 (FIG. 2) types or inputs text 254 in chat API 212A (FIG. 2). For example, at 310, chat governance monitoring environment 114A (FIG. 1) performs natural language processing on the message typed by the chat initiator 250 (FIG. 2) to assess the urgency of the message from the chat initiator 250 (FIG. 2). At step 320, the chat governance monitoring environment 114A (FIG. 1) detects and stores chat session activities and metadata of chat receiver 260 (FIG. 2) via context analytics correlation, during the initiated chat session with the chat receiver 260 (FIG. 2).

Next, at step 330, the chat governance monitoring environment 114A (FIG. 1) detects and collects activities and metadata of the chat receiver 260 (FIG. 1), for instance, feedback collector (240) monitors, detects, and collects/stores chat activities, initiated with chat receiver via chat governance monitoring environment 114A (FIG. 1) during chat sessions an initiated chat session with chat initiator 250 (FIG. 2). The collected activated of chat receiver 260 (FIG. 2) may include calendar 252 information of the chat receiver 260 (FIG. 2), relationships from intranet social networks of the chat receiver 260 (FIG. 2). Next, at step 340, integrated server environment 114B (FIG. 1) correlates engine pattern generation of the chat session, based on the detected and collected chat activities and metadata of steps 320 and 330, whereby, for example, the integrated server environment 114B (FIG. 1) feeds the collected chat activities into a processing engine of the integrated server environment 114B (FIG. 1) for generating behavioral patterns of actions of the chat initiator 250 (FIG. 2) and the chat receiver 260 (FIG. 2), based on the stored chat activities and metadata of steps 320 and 330. At step 350, the integrated server environment 114B (FIG. 1) builds a data model for the behavioral patterns, which forms a basis for decision to governance of the chat session between the chat initiator 250 (FIG. 2) and the chat receiver 260 (FIG. 2), respectively, based on the processing chat activities in step 340.

Then, at decision 370, the integrated server environment 114A (FIG. 1) determines whether to allow or deny a specific chat based on the inputs of the built data models of step 350. For example, the integrated server environment 114A (FIG. 1) consumes the feedback and past behavioral patterns for stronger model generation, based on actions of past actions, or feedbacks of the chat initiator, or the chat receiver 260 (FIG. 1). For example, if the integrated server environment 114B (FIG. 1) allows the specific chat, then, at step 380, the integrated server environment 114A (FIG. 1) analyzes feedback and past behavior of either of the chat initiator, or the chat receiver, respectively and, stores the analyzed feedback in the chat governance repository. However, if the integrated server environment 114B (FIG. 1) denies the specific chat based on the inputs of the data models, the integrated server environment 114B (FIG. 1) instantiates and calculates estimated response time in which the chat receiver 260 (FIG. 2) might respond to an initiated chat session from the chat initiator 250 (FIG. 1), based on the build behavioral patterns of the chat receiver or the chat initiator 250 (FIG. 1). Next, at step 395, the chat initiator 250 (FIG. 1) determines projected notification response time to chat initiator 250 (FIG. 1). The, at step 396, the integrated server environment 114B (FIG. 1) hibernates, based on the notification, according to embodiments.

Figure 4:
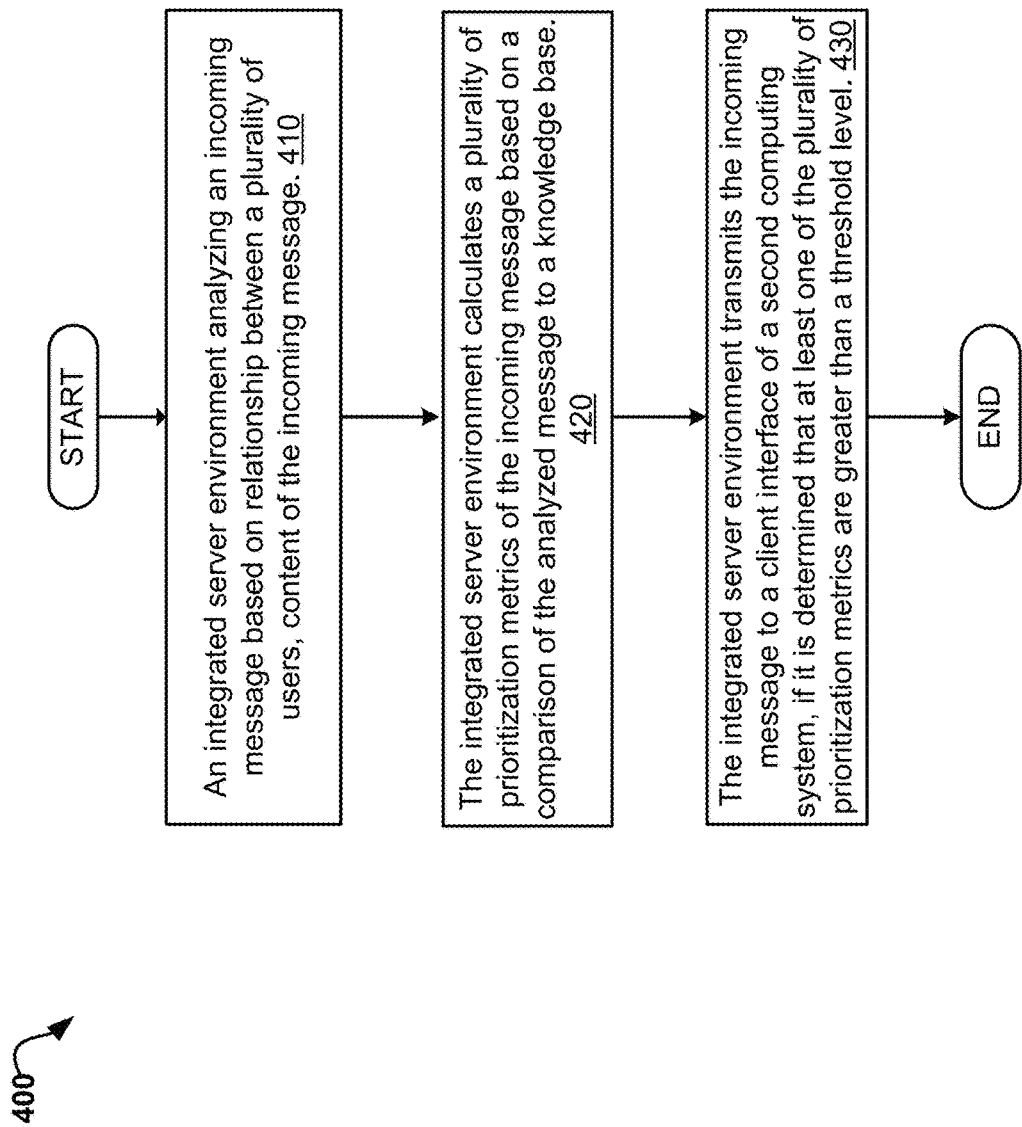
FIG. 4 illustrates an alternative operational flowchart illustrating the steps carried out by a program for cloud based chat governance system based on behavioral patterns and situational-awareness of a plurality of users, during collaborative online chat sessions according to at least one embodiment.

FIG. 4 illustrates an alternative flow diagram 400 for management of a cloud based chat governance system, between the computer 102 (FIG. 1) and the server 112 (FIG. 1) and, based on behavioral patterns of users and situational awareness of the users, such as, for instance, chat initiator 250 (FIG. 2) and chat receiver 260 (FIG. 2), all within integrated systems environment 100 (FIG. 1), according to embodiments.

It should be appreciated that FIG. 4 provides only an illustration of one implementation and does not imply any limitations with regard to the environments in which different embodiments may be implemented.

At step 410, the chat governance monitoring environment 114A (FIG. 1) analyzes via the integrated server environment 114B (FIG. 1) an incoming message based behavioral patterns of users, such as, chat initiator 250 (FIG. 2) and chat receiver 260 (FIG. 2), of a chat session, including relationship between the chat initiator 250 (FIG. 2) and chat receiver 260 (FIG. 2) and content of the incoming message, and metadata of the incoming message. For example, the chat governance monitoring environment 114A (FIG. 1) dynamically monitors and receives current or history feedback from the plurality of users to update the knowledge base metadata of the incoming message. According to embodiments, the chat governance monitoring environment 114A (FIG. 1) performs a generalized of the linear modeling of the incoming message and builds a statistical model for calculating response time of the incoming message between the chat initiator 250 (FIG. 2) and chat receiver 260 (FIG. 2). In addition, the metadata of the incoming message is based on calendar or activity history of the incoming message. Next, at step 420, the chat governance monitoring environment 114A (FIG. 1) calculates via the integrated server environment 114B, a plurality of prioritization metrics of the incoming message based on a comparison of the analyzed message to a knowledge base, wherein the knowledge base includes behavioral tendencies of users of the incoming message, patterns of interaction of the chat initiator 250 (FIG. 2) and chat receiver 260 (FIG. 2, and situational awareness of the chat initiator 250 (FIG. 2) and chat receiver 260 (FIG. 2).

Then, at step 430, the chat governance monitoring environment 114A (FIG. 1) transmits via the integrated server environment 114B the incoming message to a client interface of a chat receiver 260 (FIG. 2), if it is determined that at least one of the plurality of prioritization metrics are greater than a threshold level.

Figure 5:
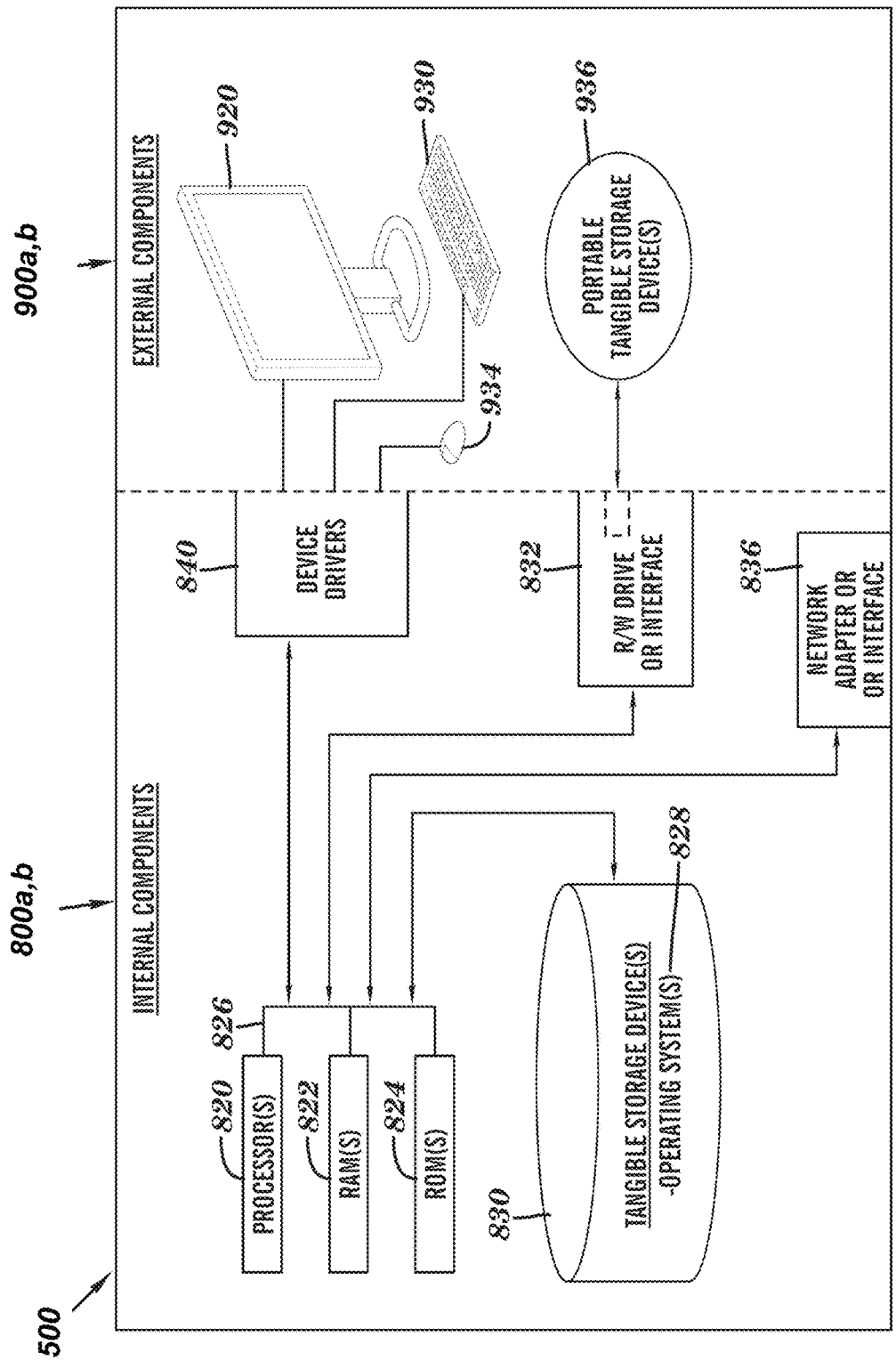
FIG. 5 is a block diagram of internal and external components of computers and servers depicted in FIG. 1 according to at least one embodiment.

FIG. 5 is a block diagram of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Chat governance monitoring environment 114A (FIG. 1) and the integrated server environment 114B (FIG. 1) include respective sets of internal components 800 a, b and external components 900 a, b illustrated in FIG. 5. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and procedure extraction of chat governance monitoring environment 114A (FIG. 1) and the integrated server environment 114B (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive.

Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as procedure extraction and software program 108A, can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. Programs of the chat monitoring environment 114A and the integrated server environment 114B may be downloaded from an external computer via a network (for example, the Internet, a local area network or other, wide area network) and respective network adapters or interfaces 836. From the network adapters or interfaces 836, the chat governance monitoring environment 114A in client computer 102 and the integrated server environment 114B (FIG. 1) in server computer 112 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
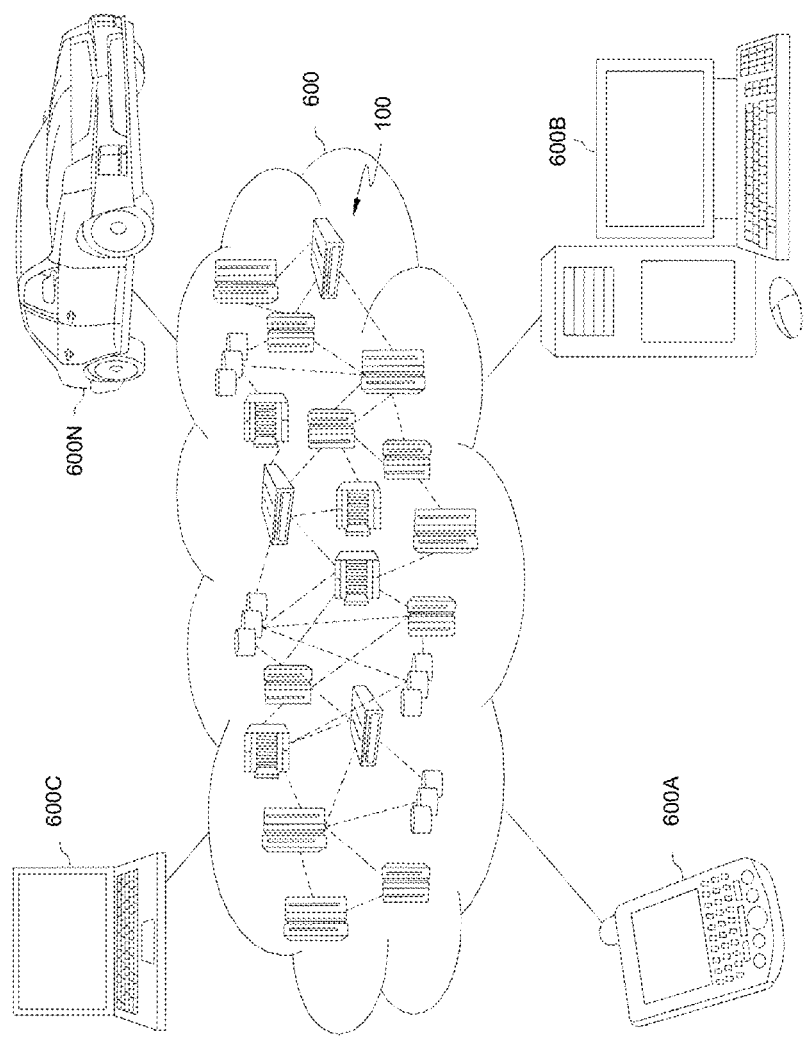
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof.

This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
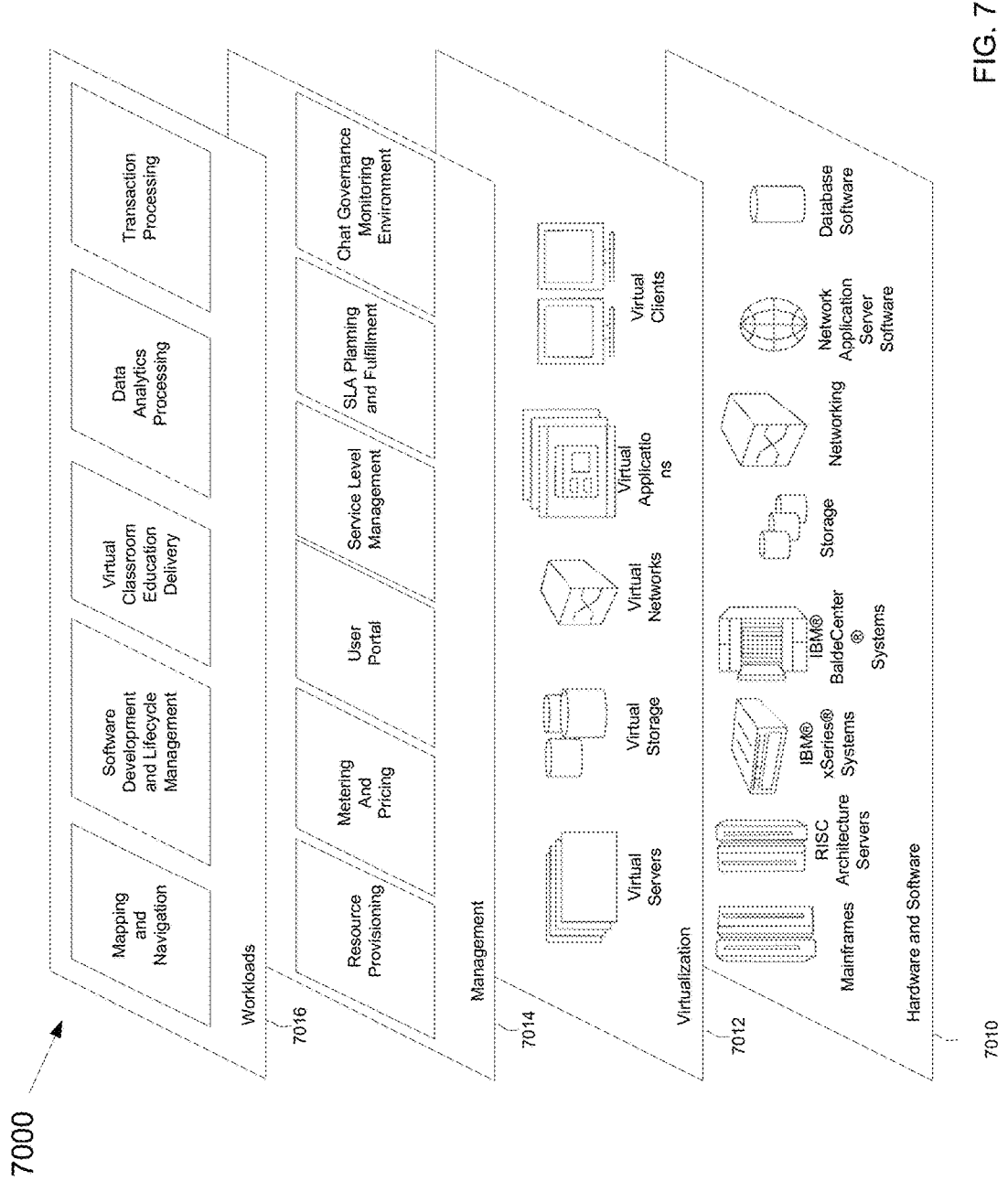
FIG. 7 is a block diagram of functional layers of the illustrative cloud computing environment of FIG. 6, in accordance with an embodiment of the present disclosure.

Referring now to FIG. 7, a set of functional abstraction layers 7000 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources.

User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An integrated server environment may interact with a chat governance monitoring environment for management a cloud based chat governance system, based on behavioral patterns of users and situational awareness of the a chat initiator and a chat receiver.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cloud based intelligent chat governance, the computer-implemented method comprising:
analyzing, by an integrated server environment using a machine learning technique, an incoming message from a chat initiator based on recorded in a chat governance repository behavioral patterns of users of a chat session, relationship between a plurality of users, content of the incoming message, and metadata of the incoming message;
calculating a plurality of prioritization metrics of the incoming message based on a comparison of the analyzed message to a knowledge base using a generalized linear modeling analysis, wherein the knowledge base includes: behavioral tendencies of users of the incoming message, patterns of interaction of the users, and situational awareness of the users, wherein the patterns persist in a dynamic knowledge base system that learns, monitors, and stores, details of the behavioral patterns of the users, and updates the behavioral patterns of the users during the chat sessions, and wherein the situational awareness of the users comprises relative hierarchical positions of the users in an organization; and
in response to a determination that at least one of the plurality of prioritization metrics is greater than a threshold level:
transmitting the incoming message to a client interface of a chat receiver; and
analyzing a feedback and a past behavior of the chat initiator and the chat receiver, and storing the analyzed feedback in the chat governance repository.

2. The computer-implemented method of claim 1, further comprises: receiving current or history feedback from the plurality of users to update the knowledge base.

3. The computer-implemented method of claim 1, wherein content of the incoming message is analyzed with natural language process.

4. The computer-implemented method of claim 1, further comprises: the first computer building a statistical model for calculating response time of the incoming message.

5. The computer-implemented method of claim 1, wherein the content of the incoming message is based on discussed topics of the incoming message between the plurality of users.

6. The computer-implemented method of claim 1, wherein the metadata of the incoming message is based on calendar or activity history of the incoming message.

7. A computer system for cloud based intelligent chat governance, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

program instructions to analyze, by an integrated server environment using a machine learning technique, an incoming message from a chat initiator based on recorded in a chat governance repository behavioral patterns of users of a chat session, relationship between a plurality of users, content of the incoming message, and metadata of the incoming message;

program instructions to calculate a plurality of prioritization metrics of the incoming message based on a comparison of the analyzed message to a knowledge base using a generalized linear modeling analysis, wherein the knowledge base includes: behavioral tendencies of users of the incoming message, patterns of interaction of the users, and situational awareness of the users, wherein the patterns persist in a dynamic knowledge base system that learns, monitors, and stores, details of the behavioral patterns of the users, and updates the behavioral patterns of the users during the chat sessions, and wherein the situational awareness of the users comprises relative hierarchical positions of the users in an organization; and in response to a determination that at least one of the plurality of prioritization metrics is greater than a threshold level:

program instructions to transmit the incoming message to a client interface of a chat receiver; and program instructions to analyze a feedback and a past behavior of the chat initiator and the chat receiver, and storing the analyzed feedback in the chat governance repository.

8. The computer system of claim 7, further comprises:
program instructions to receive current or history feedback from the plurality of users to update the knowledge base.

9. The computer system of claim 7, wherein the content of the incoming message is analyzed with natural language process.

10. The computer system of claim 7, further comprises:
program instructions to build a statistical model for calculating response time of the incoming message.

11. The computer system of claim 7, wherein the metadata of the incoming message is based on calendar or activity of history of the incoming message.

12. A computer program product for cloud based intelligent chat governance, the computer system comprising:

one or more computer-readable tangible storage devices and program instructions stored on at least one of the one or more storage devices, the program instructions comprising:

program instructions to analyze, by a machine learning technique, an incoming message based on: behavioral patterns of uses of a chat session, relationship between a plurality of users, content of the incoming message, and metadata of the incoming message;

program instructions to calculate a plurality of prioritization metrics of the incoming message based on a comparison of the analyzed message to a knowledge base using a generalized linear modeling analysis, wherein the knowledge base includes: behavioral tendencies of users of the incoming message, patterns of interaction of the users, and situational awareness of the users, wherein the patterns persist in a dynamic knowledge base system that learns, monitors, and stores, details of the behavioral patterns of the users, and updates the behavioral patterns of the users during the chat sessions, and wherein the situational awareness of the users comprises relative hierarchical positions of the users in an organization; and in response to a determination that at least one of the plurality of prioritization metrics is greater than a threshold level:

program instructions to transmit the incoming message to a client interface of a chat receiver; and program instructions to analyze a feedback and a past behavior of the chat initiator and the chat receiver, and storing the analyzed feedback in the chat governance repository.

13. The computer program product of claim 12, further comprises:
program instructions to receive current or history feedback from the plurality of users to update the knowledge base.

14. The computer program product of claim 12, wherein the content of the incoming message is analyzed with natural language process.

15. The computer program product of claim 12, further comprises:
program instructions to build a statistical model for calculating response time of the incoming message.

16. The computer program product of claim 12, wherein the metadata of the incoming message is based on calendar or activity of history of the incoming message.

17. The computer program product of claim 12, wherein the content of the incoming message is based on discussed topics of the incoming message between the plurality of users.

* * * * *